(12) United States Patent
Freund

(10) Patent No.: US 12,491,198 B2
(45) Date of Patent: Dec. 9, 2025

(54) DOXYCYCLINE INJECTION FOR SCLEROTHERAPY OF LOWER EYELID FESTOONS AND MALAR EDEMA

(71) Applicant: LKF21, LLC, New York, NY (US)

(72) Inventor: Robert Freund, New York, NY (US)

(73) Assignee: LKF21, LLC, New York, NY (US)

( * ) Notice: Subject to any disclaimer, the term of this patent is extended or adjusted under 35 U.S.C. 154(b) by 903 days.

(21) Appl. No.: 17/244,482

(22) Filed: Apr. 29, 2021

(65) Prior Publication Data

US 2021/0346407 A1 Nov. 11, 2021

Related U.S. Application Data

(60) Provisional application No. 63/023,087, filed on May 11, 2020.

(51) Int. Cl.
*A61K 31/65* (2006.01)
*A61K 9/00* (2006.01)
(Continued)

(52) U.S. Cl.
CPC ............ *A61K 31/65* (2013.01); *A61K 9/0019* (2013.01); *A61K 31/137* (2013.01);
(Continued)

(58) Field of Classification Search
CPC .... A61K 31/65; A61K 9/0019; A61K 31/137; A61K 31/167; A61K 31/245;
(Continued)

(56) References Cited

U.S. PATENT DOCUMENTS

2006/0073178 A1\* 4/2006 Giampapa .............. A61K 38/30
514/567
2007/0269385 A1\* 11/2007 Yun ....................... A61M 25/10
514/253.08
(Continued)

FOREIGN PATENT DOCUMENTS

EP 2520279 11/2012
EP 3560489 10/2019

OTHER PUBLICATIONS

Godfrey KJ, Kally P, Dunbar KE, Campbell AA, Callahan AB, Lo C, Freund R, Lisman RD. Doxycycline Injection for Sclerotherapy of Lower Eyelid Festoons and Malar Edema: Preliminary Results. Ophthalmic Plast Reconstr Surg. Sep./Oct. 2019;35(5):474-477. doi: 10.1097/IOP.0000000000001332. PMID: 30882591 (Year: 2019).\*

(Continued)

*Primary Examiner* — Kami A Bosworth
*Assistant Examiner* — Avery Smale
(74) *Attorney, Agent, or Firm* — KNOWLES INTELLECTUAL PROPERTY STRATEGIES, LLC

(57) ABSTRACT

Doxycycline injections improve the appearance of cosmetically significant lower eyelid festoons and malar edema, as well as of the jowls. The doxycycline is also useful for reducing edema of turbinates, the nasal concha or conchae shell-shaped networks of bones, vessels, and tissue within the nasal passageways that are responsible for warming, humidifying, and filtering the air as it is inhaled. The doxycline, in a concentration preferably of greater than 10 to 20 mg/ml, preferably in combination with a local anesthetic and optionally with a vasoconstrictor such as epinephrine and a pH buffering agent, is injected into the subcuticular space at the site of swelling. The high viscosity limits the spread of the doxycycline to the area to be treated. The resulting sclerosis prevents fluid accumulation. The doxy- (Continued)

cline also decreases swelling due to fat, by causing a decrease in lipomas.

11 Claims, 2 Drawing Sheets

(51) Int. Cl.
*A61K 31/137* (2006.01)
*A61K 31/167* (2006.01)
*A61K 31/245* (2006.01)
*A61K 31/44* (2006.01)
*A61M 5/32* (2006.01)
*A61P 21/00* (2006.01)
*A61P 29/00* (2006.01)

(52) U.S. Cl.
CPC .......... *A61K 31/167* (2013.01); *A61K 31/245* (2013.01); *A61K 31/44* (2013.01); *A61M 5/3287* (2013.01); *A61P 21/00* (2018.01); *A61P 29/00* (2018.01)

(58) Field of Classification Search
CPC .... A61K 31/44; A61K 31/445; A61K 9/0021; A61M 5/328; A61M 5/3287; A61P 21/00; A61P 29/00; A61P 17/00; A61P 23/02
See application file for complete search history.

(56) References Cited

U.S. PATENT DOCUMENTS

| | | | | |
|---|---|---|---|---|
| 2010/0098752 | A1* | 4/2010 | Pinsky | A61P 29/00 424/59 |
| 2014/0148417 | A1 | 5/2014 | Bouvier | |
| 2021/0154274 | A1* | 5/2021 | Sweis | A61P 29/00 |

OTHER PUBLICATIONS

Asaadi, "Etiology and treatment of congenital festoons", *Aesthetic Plast. Surg.*, 42: 1024-32 (2018).

Clive, et al., "Interventions for the management of malignant pleural effusions: A network meta-analysis", *Cochrane Database Syst. Rev.*, 2016(5):CD010529 (2016).

Godfrey, et al., "Doxycycline Injection for Sclerotherapy of Lower Eyelid Festoons and Malar Edema: Preliminary Results", *Opthalmic Plast. Reconstr. Surg.*, 35(5):474-477 (2019).

Goldberg, et al., "What causes eyelid bags? Analysis of 114 consecutive patients", *Plast. Reconstr. Surg.*, 115(5):1395-402 (2005).

Han, et al., "Doxycycline inhibits inflammation-induced Lymphangiogenesis in mouse cornea by multiple mechanisms", *PLoS One*, 9(9):e108931 (2014).

Hilton, et al., "Hyaluronidase injection for the treatment of eyelid edema: A retrospective analysis of patients", *Eur. J. Med. Res.*, 19(1):30 (2014).

Hoenig, et al., "A Vertical subperiosteal midface lift for treatment of malar festoons.", *Aesthetic Plast. Surg.*, 35:522-9 (2011).

Hurewitz, et al., "Histologic changes of doxycycline pleurodesis in rabbits. Effects of concentration and pH", *Chest*, 106(4):1241-5 (1994).

Iverson, et al., "Dermal filler-associated malar edema: Treatment of a persistent adverse effect", *Orbit*, 36(6):473-5 (2017).

Kaneka, et al., "Self-retaining lacrimal stent for NLDO and DCR, with enhanced flexibility and hydrophilic coating", written publication was orally presented at Chicago ASORPS 49th Annual Fall Scientific Symposium, Oct. 25-26, 2018.

Kpodzo, et al., "Malar mounds and festoons: Review of current management", *Aesthetic Surg. J.*, 34(2):235-48 (2014).

Medline Database Online, National Library of Medicine, Sep. 2019.

Perry, et al., "Intralesional tetracycline injection for treatment of lower eyelid festoons: a preliminary report", *Ophthal Plast Reconstr Surg.*, 31(1):50-52 (2015).

Robinson, et al., "Intrapleural doxycycline control of malignant pleural effusions", *Ann. Thorac. Surg.*, 55(5):1115-22 (1993).

Zoumalan, et al., "Managing periocular filler-related syndrome prior to lower blepharoplasty", Aesthetic Plast Surg., 43(1):115-122 (2019).

International Search Report for PCT application PCT/US2021/029901 dated Aug. 19, 2021.

* cited by examiner

DOXYCYCLINE INJECTION FOR SCLEROTHERAPY OF LOWER EYELID FESTOONS AND MALAR EDEMA

CROSS REFERENCE TO RELATED APPLICATIONS

This application claims priority to and benefit of U.S. Provisional Application No. 63/023,087 filed on May 11, 2020, the disclosure of which is hereby incorporated herein by reference in its entirety.

FIELD OF THE INVENTION

This invention is generally in the field of sclerotherapy of lower eyelid festoons and malar edema, and edema of the turbinates.

BACKGROUND OF THE INVENTION

Aesthetically undesirable lower eyelid festoons and malar edema present a clinical treatment challenge and no universally advocated treatment exists. Festoons and malar mounds are terms used to describe skin folds and swelling of the lower eyelid and cheek. The festoon is a condition in which the attenuated orbicularis muscle and lax skin forms a cascading drape of edematous excess skin inferior to the inferior orbital rim and overlying the malar eminence. Its appearance ranges from malar edema, to malar mounds, to a festoon. The presumed pathophysiology is lymphatic stasis and anatomical laxity of dermal attachments, resulting in fluid accumulation that has a characteristic clinical appearance. Goldberg et al. *Plast Reconstr Surg* 2005; 115:1395-402. The underlying pathophysiology of lower eyelid festoons and malar edema is likely the same. Commonly, osmotically active hyaluronic acid fillers, along with allergies and sinusitis, may exacerbate or create festoons. However, in the absence of an identifiable systemic etiology, they may be idiopathic.

Available treatment options include both surgical and non-surgical approaches in cases of idiopathic lower eyelid festoons or malar edema that are cosmetically concerning to patients. Previously described non-surgical treatment options include injections of tetracycline, hyaluronidase, deoxycholic acid, or oral diuretics. Perry, et al. Intralesional tetracycline injection for treatment of lower eyelid festoons: A preliminary report *Ophthal Plast Reconstr Surg* 2015; 31:50-52; CI Z. Managing periocular filler-related syndrome prior to lower blepharoplasty *Aesthetic Plast Surg* 2018; Iverson, et al. Dermal filler-associated malar edema: Treatment of a persistent adverse effect *Orbit* 2017; 36:473-5; Hilton, et al Hyaluronidase injection for the treatment of eyelid edema: A retrospective analysis of 20 patients *Eur J Med Res* 2014; 19:30; Asaadi M. Etiology and treatment of congenital festoons. *Aesthetic Plast Surg* 2018; 42:1024-32. Surgical treatment options include direct excision, lower eyelid blepharoplasty, and midface lifts with release of the orbicularis retaining ligament. Asaadi M. Etiology and treatment of congenital festoons. *Aesthetic Plast Surg* 2018; 42:1024-32; Hoenig et al., A Vertical subperiosteal midface lift for treatment of malar festoons. *Aesthetic Plast Surg* 2011; 35:522-9; Kpodzo D, Nahai F, McCord C D. Malar mounds and festoons: Review of current management *Aesthetic Surg J* 2014; 34:235-48. These options may demonstrate variable efficacy, have undesirable risks and side effects, or are technically challenging to prepare and administer in the clinical setting.

It is therefore an object of the present invention to provide a composition and method of use as a more efficacious non-surgical method to treat festoons and malar edema (mounds).

SUMMARY OF THE INVENTION

Doxycycline injections improve the appearance of cosmetically significant lower eyelid festoons and malar mounds and malar edema, as well as of the jowls, turbinate hypertrophy, nasal obstruction, and lymphodema. The doxycycline is also useful for reducing edema of turbinates, the nasal concha or conchae shell-shaped networks of bones, vessels, and tissue within the nasal passageways that are responsible for warming, humidifying, and filtering the air as it is inhaled. The doxycycline, in a concentration preferably of greater than 10 mg/ml, up to about 20 mg/ml, typically in a volume of between 0.15 and 2 mls, are injected at each injection site is injected into the subcuticular space at the site of swelling in a festoon or in the submucosal space in the turbinate. The high viscosity limits the spread of the doxycycline to the area to be treated. The resulting sclerosis prevents fluid accumulation. The doxycycline also decreases swelling due to fat, by causing a decrease in lipomas. Due to the pain associated with the doxycycline injection, in the preferred embodiment the formulation includes, or is co-administered with, a local injection, Sustained release is not required for effective pain relief. The doxycycline may be administered with, before or after, co-administration of a local anesthetic, preferably with a buffering agent to insure low pH to enhance diffusion into nerve cells. Suitable local anesthetics include ester or amide local anesthetics such as lidocaine, prilocaine, mephacaine, bupivacaine, procaine and chloroprocaine.

The formulation may be a solution, suspension, or be formulated as liposomes or as an emulsion.

In some embodiments, dosage unites include doxycycline in concentrations of 10 mg/ml, 15 mg/ml and 20 mg/ml. Based on clinical studies, the 15 and 20 mg doses have better skin contraction benefits. The 10 mg/ml is the optimal dosage for treatment of malar edema and malar mounds. When there are skin changes, one can use the 15 mg/ml and 20 mg/ml to obtain more skin contraction as well. The 20 mg/ml dose is particularly useful for treatment of saggy jowls to achieve the best skin contraction as part of the procedure.

In a preferred embodiment, the doxycline is mixed with a lidocaine solution. Ideally, the local anesthetic is 0.3% lidocaine in a phosphate buffered solution. Other embodiments include: 10 mg/ml Doxycycline+Lidocaine 0.3%; 15 mg/ml Doxycycline+Lidocaine 0.3% to Lidocaine 0.45%; and 20 mg/ml Doxycycline+Lidocaine 0.3-0.6% Lidocaine.

The pH for doxycycline (creates a microenvironment of pH 3-4) is quite different from the pH at which lidocaine is most effective.(8.4). Accordingly, in one embodiment, a two phase solution is used to avoid loss of efficacy. This consists of lidocaine in an aqueous basic solution and a protected delivery system for the Doxycycline having doxycycline hyclate at its core. This avoids neutralization of the lidocaine, and provides controlled and delayed release of the Doxycycline to the targeted tissue over a specific period of time (1-4 hours). Delivery vehicles that can be used to achieve a suitable two phase formulation include putting the doxycline in nanoparticles, especially particles formed of biodegradable polymer which provides burst release and sustained release, micelles or liposomes. These can also be targeted using ligands such as ligands to P-selectin, endothelial selectin and ICAM-1, to target endothelial cells in the lymphatic tissue or the festoon thus to further increase efficacy.

The formulation may also be administered before, at the time of, or after administration of a vasoconstrictor such as epinephrine, used to minimize diffusion of the doxycycline and enhance duration of action. Minocycline can be used instead of doxycycline or in addition to doxycycline.

A device for injection into the turbinate is shown below. This is designed to expose the needle for injection when the button on the syringe body is pressed, where the needle guide closes when it reaches the end of the turbinate.

An initial study of 15 consecutive patients with malar edema and/or festoons were injected with doxycycline hyclate at a concentration of 10 mg/mL. Pre- and post-injection photographs were reviewed and graded on a scale of 0 to 3 (0 no festoon, 1 small festoon, 2 medium festoon, 3 large festoon) by two blinded physician observers. Patients were excluded from the final analysis if they received an alternate dose concentration, had incomplete photographic records, or did not follow up. Student t-test was used for statistical analysis.

The results of 20 consecutive treatment areas of 11 patients were included in the analysis. Final follow up ranged from 3 to 104 weeks, with a mean follow up of 22.5 weeks. The average (SD) initial festoon grade of 2.5 (0.58) decreased to 0.9 (0.82) with a p-value<0.001. The average number of injections performed per side was 1.4 (range 1 to 2). The mean volume per injection was 0.72 mL (range 0.15 mL to 2.0 mL). Commonly documented subjective complaints were burning sensation, pain, bruising and erythema. There were no other dermatological or visual complications following treatment.

This study shows that intralesional injections of doxycycline hyclate at a concentration of 10 mg/mL is a statistically more effective treatment option for cosmetically significant lower eyelid festoons and malar edema than other treatments including injection with tetracycline. The clinical trails showed efficacy in treatment of festoons. Some have permanent changes to skin. However it appears that 10 mg/ml is not adequate to contract skin, and that one needs 15-20 mg doxycycline/ml to cause skin to contract.

BRIEF DESCRIPTION OF THE DRAWINGS

FIG. 1A is a patient with bilateral lower eyelid festoons. FIG. 1B is a patient with bilateral malar mounds/edema (demarcated by dots), likely caused by fluid accumulation due to impaired lymphatic drainage suspended by midfacial retaining ligaments include the orbital retaining ligament and the orbitozygomatic ligament.

DETAILED DESCRIPTION OF THE INVENTION

Figure 1A:
FIGS. 1A and 1B are representative photographs of lower eyelid festoons and malar edema.
Figure 1B:
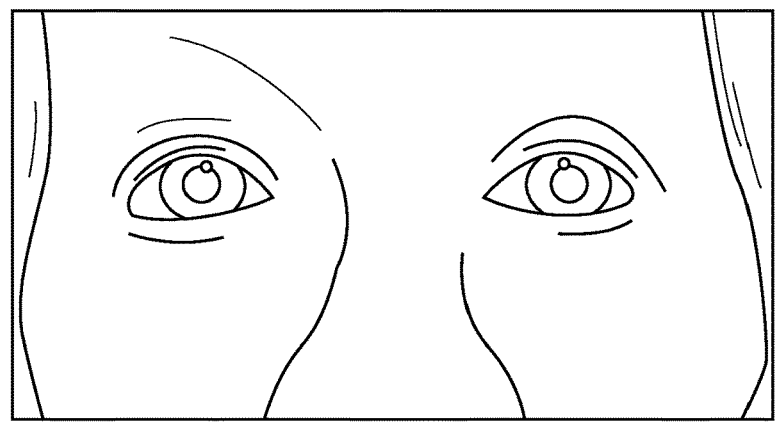
Figure 2:
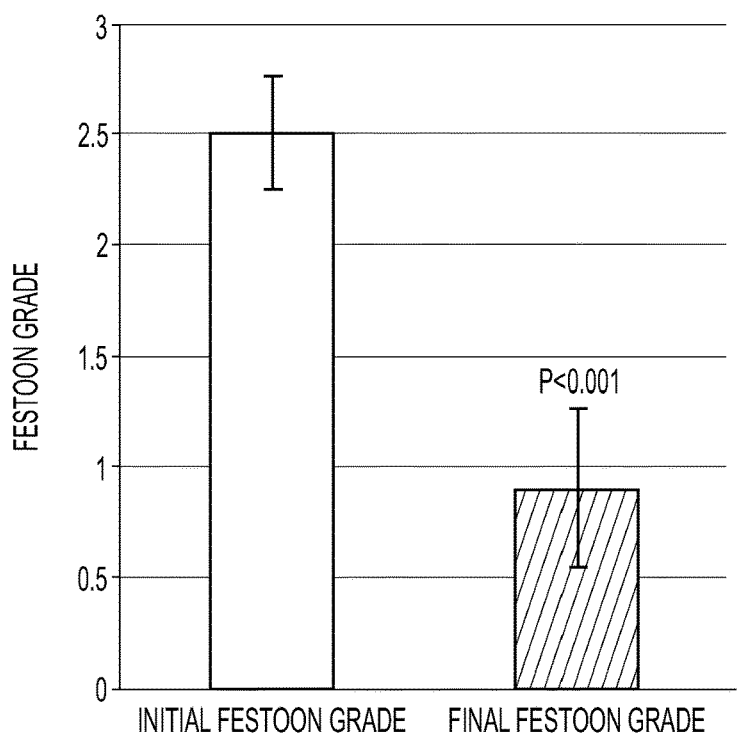
FIG. 2 is a graph of the pre- and post-injection scores as graded by blinded physician observers demonstrating a statistically significant improvement in the appearance of lower eyelid festoons and malar edema following intralesional injection with doxycycline 10 mg/mL
Figure 3A:
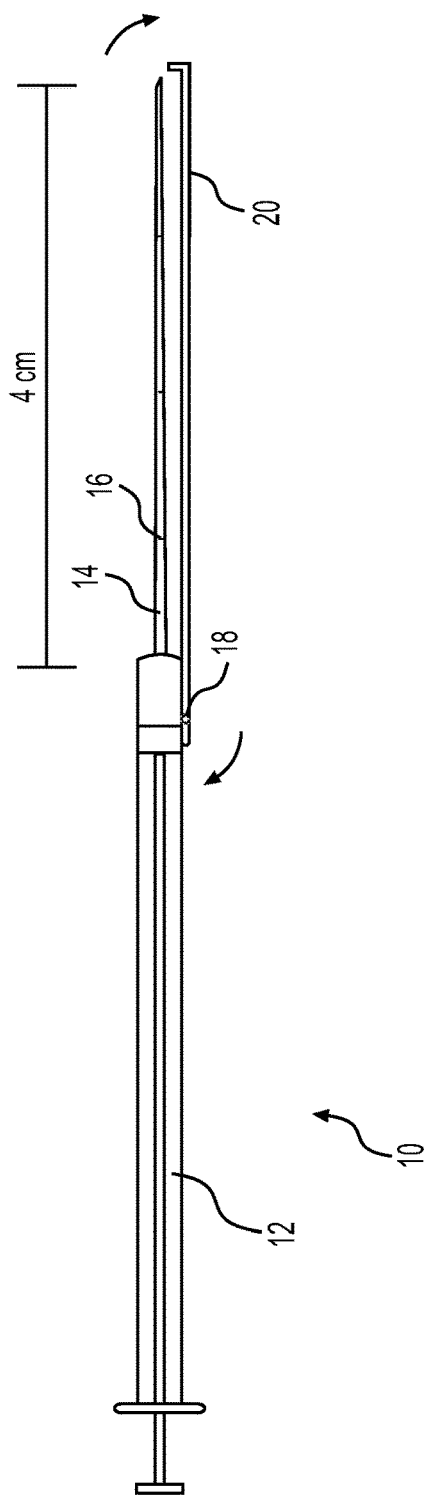
FIGS. 3A and 3B are prospective schematics of a syringe 10 with a scored needle guide 20 for injection of doxycycline into the turbinates 22, FIG. 3A of the syringe 10 with needle guide 20, and FIG. 3B showing the injection into the turbinate 22 to the point where the needle guide closes when it reaches the end of the turbinate.
Figure 3B:
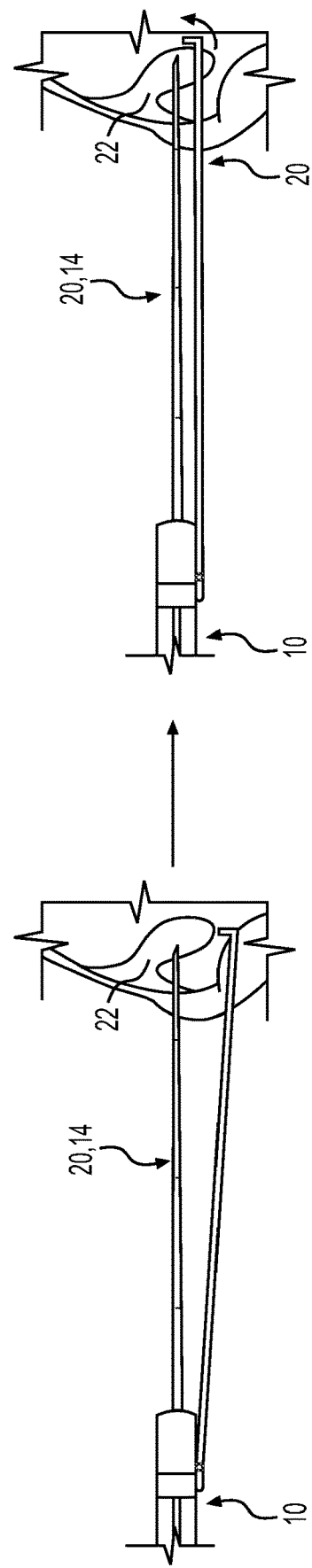

I. Formulations
Sclerosis Agents

In the preferred embodiment, doxycycline is administered to the regions of the face where edema has caused undesired swelling or interference with breathing, including lower eyelid festoons, malar mounds, the turbinates, respectively.

Doxycycline is a member of the tetracycline family that is used to treat bacterial infection. Injectable doxycycline (usually doxycycline hyclate) is an antibiotic in the tetracycline family that is used as a sclerosing agent of fluid cavities throughout the body (CIZ 2018; Bansel 2019). In contrast to tetracycline (Perry, 2015), doxycycline is readily available in intravenous form, which can be reconstituted in the office and injected off-label, making it a logistically simpler treatment option for clinicians.

Doxycycline has been used for sclerotherapy after percutaneous drainage, to treat lymphoceles, using a dosage of 10 mg doxycycline/ml. The doxycycline is preferably administered with a local anesthetic such as lidocaine, just above the muscle at the site to be treated for edema. The doxycycline then causes sclerosis just above and to the adjacent muscle.

The doxycycline has to be processed as a solid, then administered as a liquid to be effective. The viscosity of the solution is critical, with effective concentration ranges between 10 and 20, preferably great than 10, mg/m (1-2%). It has been discovered that it provides statistically greater benefit when administered as a sclerosing agent in this concentration range, as compared to other agents such as tetracycline. Studies with 1 mg/ml and 5 mg/ml did not show as much efficacy. Doxycycline has a significantly lower risk of necrotizing dermalysis than tetracycline.

Doxycycline is typically available as a solid, which is resuspended with sterile water or saline. In some cases, minocycline can be used instead of doxycycline. Minocycline is used in a dosage equivalent to doxycycline.

Formulations may be solutions, suspensions, liposomal or emulsions.

Local Anesthetics

In a preferred embodiment the doxycycline is administered with, or after administration, a local anesthetic. Preferred amid local anesthetics include lidocaine, prilocaine, mephacaine and bupivacaine. Preferred ester local anesthetics include procaine and chloroprocaine.

Since local anesthetics such as lidocaine do not penetrate nerve cells at low pH (i.e., at less than 7.4), and doxycycline has a low pH, the formulation must include a pH buffering agent or be in a carrier such as an aqueous buffer, liposome or emulsion formulation. The lidocaine in buffered aqueous formulation which is effective to counter the low pH of the doxycline and raise the pH to 7.4 insure maximum pain relieve as well as efficacy of the doxycycline. The formulation can also be used to control the rate of doxycycline release from a period of about four hours to about four days.

Vasoconstrictors

A vasoconstrictor such as epinephrine may also be administered with the formulation, thereby prolonging efficacy of the doxycycline and decreasing diffusion of the actives.

Formulations

In a preferred embodiment, the doxycline is mixed with a lidocaine solution. Ideally, the local anesthetic is 0.3% lidocaine in a phosphate buffered solution. Other embodiments include: 10 mg/ml Doxycycline+Lidocaine 0.3%; 15 mg/ml Doxycycline+Lidocaine 0.3% to Lidocaine 0.45%; and 20 mg/ml Doxycycline+Lidocaine 0.3-0.6% Lidocaine.

The pH for doxycycline (creates a microenvironment of pH 3-4) is quite different from the pH at which lidocaine is most effective.(8.4). Accordingly, in one embodiment, a two phase solution is used to avoid loss of efficacy. This consists of lidocaine in an aqueous basic solution and a protected delivery system for the Doxycycline having doxycycline hyclate at its core. This avoids neutralization of the lidocaine, and provides controlled and delayed release of the Doxycycline to the targeted tissue over a specific period of time (1-4 hours). Delivery vehicles that can be used to achieve a suitable two phase formulation include putting the doxycline in nanoparticles, especially particles formed of biodegradable polymer which provides burst release and sustained release, micelles or liposomes. These can also be targeted using ligands such as ligands to P-selectin, endothelial selectin and ICAM-1, to target endothelial cells in the lymphatic tissue or the festoon thus to further increase efficacy.

II. Methods of Treatment

Doxycycline hyclate suspension, in a concentration of 10 to 20 mg/ml, preferably greater than 10 to 20 mg/ml, is injected into festoons and malar mounds as needed, to reduce edema. Typical injection volumes are between 0.15 mL and 2.0 mL. It is important to inject into the subcuticular space (between the skin and the muscle), not into the muscle, skin or lesion, to avoid deep space sclerosis and resulting swelling. The amount is that which is sufficient to cause an inflammatory response, but not necrosis.

In some embodiments, dosage unites include doxycycline in concentrations of 10 mg/ml, 15 mg/ml and 20 mg/ml. Based on clinical studies, the 15 and 20 mg doses have better skin contraction benefits. The 10 mg/ml is the optimal dosage for treatment of malar edema and malar mounds. When there are skin changes, one can use the 15 mg/ml and 20 mg/ml to obtain more skin contraction as well. The 20 mg/ml dose is particularly useful for treatment of saggy jowls to achieve the best skin contraction as part of the procedure. Although the precise mechanism of action of doxycycline as a sclerosing agent is unknown, its effects have been attributed to inhibition of matrix metalloproteinases, cell proliferation, and suppression of vascular endothelial growth factor. (Han L, *PLoS One* 2014; 9:e108931) It has been demonstrated to induce collagen and fibrin deposition, creating dense adhesions and fibrosis (Hurewitz A, Lidonicci K, Wu L, et al Histologic changes of doxycyline pleurodesis in rabbits. Effects of concentration and ph. *Chest* 1994; 106:1241-5). Doxycycline has been cited as a treatment for various fluid-filled lesions throughout the body (Kitamura et al. *Curr Ther Res* 1981 30:515-21; Robinson et al. *Ann Thorac Surg* 1993; 55:1115-21); Clive A, Interventions for the management of malignant pleural effusions: A network meta-analysis *Cochrane Database Syst Rev* 2016; 8:CD010529) Doxycycline has also been used as a sclerotherapeutic agent in the treatment of postoperative lymphoceles, low flow venous malformations, and lymphangiomas of the abdomen and head and neck, and closed-skin degloving injuries. In the periocular region, oral doxycycline has also been reported as an effective treatment for blepharochalasis through a presumed mechanism of inhibiting matrix metalloproteinases.

However, it required testing in a study with human patients as to whether one could obtain efficacy in treatment of very small lesions, injecting into the space between the skin and muscle, to avoid the problems encountered with tetracycline when used for the same indication.

III. Device for Injection into Turbinates

Using the device 10 shown in FIGS. 3A and 3B, the doxycycline can be injected into the turbinates 22 to reduce swelling. The device 10 shown in FIG. 3A includes a syringe body 12, a needle 14 (approximately 4 cm long in one embodiment) score 16 for dosing, and needle guide 20 that is retractable when the button 18 is pushed. This is injected into the turbinate as shown in FIG. 3B, so that the needle 20 guide closes as it reaches the end of the turbinate 22.

The present invention will be further understood by reference to the following non-limiting examples.

Example 1: Treatment of Festoons and Malar Edema with Doxycycline

Materials and Methods:

Institutional Review Board (IRB) approval was obtained. A retrospective chart review was performed on 15 consecutive patients injected with doxycycline hyclate at a concentration of 10 mg/mL directly into their malar edema and festoons. The primary outcome measure was improvement in the appearance of lower eyelid festoons or malar edema. Pre- and post-injection photographs were reviewed and graded on a scale of 0 to 3 (0 no festoon, 1 small festoon, 2 medium festoon, 3 large festoon) by two blinded physician observers. All pre- and post-treatment photographs were taken in a standardized position without the use of a flash device. Written consent was obtained for the use of photographs and is on file with the authors. Additional data collected included patient age, volume of injection, location of injection, number of injections, and subjective complaints. Patients were excluded from the final analysis if they received an alternate dose concentration, had incomplete photographic records, or did not follow up. Student t-test was used for statistical analysis.

Patients were offered injections in clinic or in the operating room with intravenous sedation, with or without concurrent eyelid surgery. For injections performed in the operating room, doxycycline hyclate was ordered from the hospital pharmacy at a concentration of 10 mg/mL. For injections performed in the office, doxycycline hyclate 100 mg sterile powder, lyophilized (Fresenius Kabi, Lake Zurich, Illinois, USA) was diluted to a concentration of 10 mg/mL with sterile 0.9% bacteriostatic sodium chloride solution. The solution was refrigerated at 25 degrees Celsius, used within 48 hours of reconstitution, and protected from direct sunlight. Injections were performed using 1.0 mL syringes on a 30-gauge needle, directly into the festoon in multiple deep and intermediate planes beneath skin and muscle. Analysis of protected health information was compliant with the Health Insurance Portability and Accountability Act (HIPAA) and adherent to the Declaration of Helsinki.

Results:

The clinical and photographic records of 15 consecutive patients receiving intralesional doxycycline hyclate injections for the treatment of malar edema and lower eyelid festoons were reviewed and 11 patients were included in the analysis. Representative patient is shown in FIGS. 1A (before treatment) and 1B (after treatment). In these 11 patients, 20 treatment sides were analyzed. Treatment was bilateral in 9 cases and unilateral in 2 cases. Final follow up ranged from 3-104 weeks, with a mean follow up of 22.5 weeks.

The average (standard deviation) initial festoon grade of 2.5 (0.58) decreased to 0.9 (0.82). The mean difference in festoon grade following intralesional doxycycline injection was statistically significant (p-value<0.001). (FIG. 2) The mean number of injections performed per side was 1.4 (range 1-2). The mean volume per injection was 0.72 mL (range 0.15 mL to 2.0 mL).

Six patients underwent injections in the office and 5 patients underwent injections in the operating room while under IV sedation. Six out of 6 (100%) patients undergoing office injections without sedation (including 2 repeat injections) reported burning pain during the injection that resolved completely prior to leaving the office. Average duration of burning sensation was 7 minutes (range 2-10 minutes).

Skin redness was reported by 3 patients with symptoms that lasted an average of 2 days (range 1-3 days), but was not uniformly documented in all cases. Bruising was reported by 7 patients and lasted an average of 10 days (range 7-28 days), but was also not uniformly documented in all cases.

There were no other patient-reported or physician-observed dermatological or visual complications following treatment. Specifically, no episodes of vision loss, ocular surface symptoms, skin necrosis, or ischemia occurred.

Intralesional injections of doxycycline hyclate is an effective treatment modality for the aesthetic correction of lower eyelid festoons and malar mounds or edema. This study shows that intralesional injections of doxycycline hyclate at a concentration of 10 mg/mL is a statistically more effective treatment option for cosmetically significant lower eyelid festoons and malar edema than other treatments including injection with tetracycline. The clinical trails showed efficacy in treatment of festoons. Some have permanent changes to skin. However, subsequent studies and analysis has demonstrated that that 10 mg/ml is not adequate to contract skin, and that one needs 15-20 mg doxycycline/ml to cause skin to contract.

Modifications and variations of the present invention will be apparent to those skilled in the art and are intended to come within the scope of the appended claims.

I claim:

1. A method of reducing swelling in a festoon, malar mound, jowls or turbinate comprising
    injecting into a space between skin and muscle at a site of a swelling in a festoon malar mound, jowls or turbinate doxycycline or minocycline in an amount effective to cause sclerosis reducing fluid accumulation in the swelling and
    an ester or an amide local anesthetic selected from the group consisting of lidocaine, prilocaine, mephacaine, bupivacaine, procaine and chloroprocaine in an amount effective to reduce pain associated with the sclerosis caused by the doxycycline or minocycline.

2. The method of claim 1 wherein the injecting the doxycycline or the minocycline comprises injecting the doxycycline.

3. The method of claim 1 wherein the swelling is in the festoons or the malar mounds.

4. The method of claim 1 wherein the swelling is in the jowls.

5. The method of claim 1 wherein the swelling is in the turbinate.

6. The method of claim 5 wherein the doxycycline or the minocycline injected into the turbinate has a concentration of greater than 10 mg/ml.

7. The method of claim 5 wherein the injecting comprises injecting the doxycycline or minocycline using a needle with a needle guide to guide injection of the doxycycline or the minocycline into the turbinate.

8. The method of claim 1 wherein the injecting the doxycycline or the minocycline comprises injecting the doxycline or minocycline in a concentration between 10 and 20 mg/ml.

9. The method of claim 1 wherein the injecting comprises injecting between 1.5 and 2 mls of the doxycycline or the minocycline in combination with the ester or the amide local anesthetic at each of one or more injection sites.

10. The method of claim 1 wherein the injecting the minocycline or the doxycycline comprises injecting the minocycline.

11. The method of claim 1 further comprising administering a vasoconstrictor to a site of injection.

* * * * *